(12) United States Patent
Erhard

(10) Patent No.: US 11,312,441 B2
(45) Date of Patent: Apr. 26, 2022

(54) TANK ASSEMBLY ON A FRAME OF A MOTORCYCLE, FRAME ELEMENT FOR A MOTORCYCLE, AND MOUNTING METHOD

(71) Applicant: Bayerische Motoren Werke Aktiengesellschaft, Munich (DE)

(72) Inventor: Daniel Erhard, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 259 days.

(21) Appl. No.: 16/745,626

(22) Filed: Jan. 17, 2020

(65) Prior Publication Data

US 2020/0148293 A1    May 14, 2020

Related U.S. Application Data

(63) Continuation of application No. PCT/EP2018/075170, filed on Sep. 18, 2018.

(30) Foreign Application Priority Data

Oct. 5, 2017    (DE) .................... 10 2017 217 662.8

(51) Int. Cl.
  *B62J 35/00* (2006.01)
  *B60K 15/067* (2006.01)

(52) U.S. Cl.
  CPC ............ *B62J 35/00* (2013.01); *B60K 15/067* (2013.01)

(58) Field of Classification Search
  CPC ...... B62J 35/00; B60K 15/063; B60K 15/067; B60K 15/07; B60K 15/073
  See application file for complete search history.

(56) References Cited

U.S. PATENT DOCUMENTS

| | | | | |
|---|---|---|---|---|
| 4,799,569 A | * | 1/1989 | Hattori | B62J 35/00 180/219 |
| 6,213,514 B1 | * | 4/2001 | Natsume | B62M 6/55 280/833 |
| 6,910,716 B2 | * | 6/2005 | Kurayoshi | B62J 35/00 280/835 |

(Continued)

FOREIGN PATENT DOCUMENTS

| JP | 62-28692 U | 2/1987 |
|---|---|---|
| JP | 2005-47403 A | 2/2005 |
| JP | 2012-131416 A | 7/2012 |

OTHER PUBLICATIONS

International Search Report (PCT/ISA/210) issued in PCT Application No. PCT/EP2018/075170 dated Jan. 4, 2019 with English translation (five (5) pages).

(Continued)

*Primary Examiner* — Tony H Winner
*Assistant Examiner* — Maurice L Williams
(74) *Attorney, Agent, or Firm* — Crowell & Moring LLP

(57) ABSTRACT

A tank assembly is supported against movement on a frame of a two-wheeled vehicle such as a motorcycle by support elements that engage respective bearing elements on lateral sides of the frame. An associated securing element is secured to each lateral side of the frame element in the region adjacent to the respective bearing elements. The securing elements surround the associated support element at a spacing, being arranged to limit movement of the securing elements and the tank away from the frame.

7 Claims, 2 Drawing Sheets

(56) References Cited

U.S. PATENT DOCUMENTS

| | | | |
|---|---|---|---|
| 7,422,243 B2 | 9/2008 | Kudo et al. | |
| 7,475,749 B2* | 1/2009 | Yoshida | B62J 35/00 |
| | | | 180/229 |
| 7,549,675 B2* | 6/2009 | Satake | B62J 35/00 |
| | | | 180/219 |
| 8,016,321 B2* | 9/2011 | Shimomura | B62J 35/00 |
| | | | 280/833 |
| 8,205,313 B2* | 6/2012 | Kaneyasu | F16F 1/376 |
| | | | 29/428 |
| 8,662,518 B2* | 3/2014 | Koike | F02M 35/10052 |
| | | | 280/288.4 |
| 9,579,972 B2* | 2/2017 | Taniguchi | B60K 15/067 |
| 10,427,744 B2* | 10/2019 | Matsuo | F16F 1/3732 |
| 2003/0075659 A1 | 4/2003 | Fukunaga et al. | |
| 2004/0238247 A1 | 12/2004 | Ohashi et al. | |
| 2012/0200096 A1 | 8/2012 | Galloway et al. | |
| 2014/0262580 A1 | 9/2014 | Bagnariol | |
| 2015/0367726 A1* | 12/2015 | Taniguchi | B60K 15/067 |
| | | | 280/834 |

OTHER PUBLICATIONS

German-language Written Opinion (PCT/ISA/237) issued in PCT Application No. PCT/EP2018/075170 dated Jan. 4, 2019 (six (6) pages).

German-language Search Report issued in counterpart German Application No. 10 2017 217 662.8 dated Aug. 28, 2018 with partial English translation (11 pages).

* cited by examiner

TANK ASSEMBLY ON A FRAME OF A MOTORCYCLE, FRAME ELEMENT FOR A MOTORCYCLE, AND MOUNTING METHOD

CROSS REFERENCE TO RELATED APPLICATIONS

This application is a continuation of PCT International Application No. PCT/EP2018/075170, filed Sep. 18, 2018, which claims priority under 35 U.S.C. § 119 from German Patent Application No. 10 2017 217 662.8, filed Oct. 5, 2017, the entire disclosures of which are herein expressly incorporated by reference.

BACKGROUND AND SUMMARY OF THE INVENTION

The invention relates to a tank arrangement on a frame of a powered two-wheeler, to a frame element for a powered two-wheeler, and to a mounting method for a tank on a frame of a powered two-wheeler.

In the case of tank attachments for powered two-wheelers, it is already widely known to support the tank via respective supporting elements which are arranged on a first side of the tank on respectively assigned bearing elements which are arranged on the two outer sides of a frame element of the powered two-wheeler. This means that the bearing elements are arranged on different sides of the frame element along the vehicle transverse direction. Here, the bearing elements are configured, for example, as star-shaped rubber elements and, in the case of mounting of the tank on the frame element, are enclosed at least in regions by the respective supporting elements and are possibly pressed in. This serves to fix the tank on the frame element in the vehicle vertical direction and in the vehicle transverse direction of the powered two-wheeler. In order to secure the tank against a movement in the vehicle longitudinal direction of the powered two-wheeler, a fastening device is provided which is arranged on a side of the tank, which side lies opposite the first side, and by means of which fastening device the tank can be fastened to the frame of the powered two-wheeler.

US 2012/0200096 A1 has disclosed a mount, by means of which a respective bracket of a tank of a powered two-wheeler can be brought into engagement with two corresponding bolts of a frame element of the powered two-wheeler. For this purpose, the mount device comprises a planar main element which has two openings which extend perpendicularly with respect to one another. The respective mounts of the tank can be received in said openings. Moreover, the main element has two keyhole-shaped openings for the bolts.

It is an object of the present invention to provide a tank arrangement on a frame of a powered two-wheeler, a frame element for a powered two-wheeler, and a mounting method, by means of which a tank of a powered two-wheeler can be fastened particularly simply to a frame of the powered two-wheeler and, in an installed position, is protected in a particularly satisfactory manner against a lateral action of force.

In order to provide a tank arrangement on a frame of a powered two-wheeler of the type mentioned at the outset, which can be mounted particularly simply and is protected in a particularly satisfactory manner against a lateral action of force, it is provided according to the invention that an associated securing element is fixed on the corresponding outer side of the frame element in the region of the respective bearing element, which securing element surrounds the assigned supporting element at a spacing. This means that the associated securing element is fixed or fastened on the outer side of the frame element next to the respective bearing element in a close region of the respective bearing element. Therefore, a spacing between the securing element and the respective bearing element is, for example, at most 150 millimeters, in particular at most 100 millimeters, in particular at most 50 millimeters, with the result that, in an installed state of the tank, an attachment of the respective supporting element which is connected to the bearing element is protected by means of the securing element in a particularly satisfactory manner against the lateral action of force. For this purpose, the securing element surrounds the associated supporting element at a spacing, in order to ensure that the securing element which is connected fixedly to the frame element does not transmit oscillations and/or vibrations of the frame element, or merely transmits them as little as possible, to the tank via its respective supporting elements. As a result of the connection of the respective bearing elements to the respective supporting elements, the tank is secured against a relative movement in the vehicle vertical direction relative to the frame element. The securing element can be configured, for example, in the form of a tab and can comprise a material which corresponds to a material of the frame element. The respective securing element which is arranged in the region of the respective bearing element secures the tank at least substantially against a relative movement of the tank in the vehicle transverse direction relative to the frame element. This securing can prevent, in the case of a force which acts on the tank in the vehicle transverse direction, at least one supporting element being released from the respectively assigned bearing element. As a consequence, this so-called unclipping of the supporting element from the bearing element can be prevented at least substantially by way of the associated securing element.

It is provided in one advantageous refinement of the invention that the tank is formed from a plastic, and the securing element is formed from a metal. The tank which is formed from a plastic is particularly light and particularly inexpensive in comparison with a metal tank. Since, however, the plastic tank can be deformed, in particular, in the vehicle transverse direction on account of an inner positive pressure or on account of a lateral action of force, as a result of which the supporting elements which are arranged on the tank can be released from the respective assigned bearing elements, the respective associated securing element is necessary to prevent unclipping. As a result of the configuration of the securing element from the metal, said securing element has a particularly high stability. Moreover, a risk of corrosion can be kept particularly low if the respective securing element comprises the same metal as the frame element of the frame of the powered two-wheeler.

Moreover, it has been shown to be advantageous if the respective supporting elements are configured as part of the tank and comprise a plastic. In particular, the respective supporting elements comprise the same plastic as the tank. As a result of a configuration of the respective supporting elements as part of the tank, they are connected to the tank in a particularly stable and particularly secure manner, with the result that a disconnection of the respective supporting elements from the tank is particularly improbable.

It is provided in a further advantageous refinement of the invention that the respective supporting elements have a side which faces the frame element and on which the supporting elements in each case have a C-shaped cutout, which C-shaped cutouts can be brought into engagement with the respective bearing elements in the case of an arrangement of the tank on the frame element. In the installed state of the tank, the C-shaped cutout extends at least substantially in the vehicle longitudinal direction of the powered two-wheeler and, for example, merely over a part of the depth of the respective supporting element, with the result that a side of the respective supporting element, which side faces away from the frame element, does not have the C-shaped cutout. For example, the C-shaped cutout is arranged on that side of the supporting element which faces the frame element, and extends over half the depth of the supporting element. In the respective C-shaped cutout of the respective supporting element, in the installed state of the tank, the respective bearing elements are received at least in regions in the respective C-shaped cutout. In particular, in the installed state, the respective bearing elements are pressed in regions into the respective C-shaped cutouts, with the result that the respective supporting elements are connected to the assigned bearing elements in a positively locking manner at least in regions and/or are connected in a non-positive manner at least in regions.

A further aspect of the invention relates to a frame element for a powered two-wheeler, having two bearing elements which are arranged on the two outer sides of the frame element and via which a tank of the powered two-wheeler can be supported in its installed state by means of respectively assigned supporting elements of the tank. In order to make particularly simple mounting of the tank on the frame element possible and in order to make securing of the tank which is situated in its installed state against an action of force in the vehicle transverse direction possible, according to the invention an associated securing element is fixed on the corresponding outer side of the frame element in the region of the respective bearing element, which securing element surrounds the assigned supporting element at a spacing. This means that the frame element has in each case one bearing element and one associated securing element on its two outer sides. Here, the respective bearing elements are arranged on outer sides of the frame element which lie opposite one another in the vehicle transverse direction. The associated securing elements surround the assigned supporting elements of the tank in its installed state at a spacing, in order to at least substantially prevent a transmission of oscillations and/or a transmission of vibrations from the frame element to the tank. By means of the securing elements, the tank is secured against a relative movement relative to the frame element along the vehicle transverse direction, whereas the tank is protected against a relative movement of the tank along the vehicle vertical direction relative to the frame element by means of the supporting elements which are brought into engagement with the bearing elements. This makes a particularly secure attachment of the tank on the frame element possible.

It is provided in one advantageous refinement of the invention that the securing element is arranged on the outer side of the frame element in a close region next to the bearing element which comprises a star-shaped rubber element. This means that the securing element is arranged in front of or behind the associated bearing element, for example, along the vehicle longitudinal direction. Here, the close region is to be understood to mean that a spacing between the securing element and the bearing element is at most 150 millimeters, in particular at most 100 millimeters, in particular at most 50 millimeters. This makes particularly simple mounting of the tank on the frame element possible, by the supporting elements of the tank being brought into engagement in a time-shifted manner with the bearing elements and the securing elements.

A further aspect of the invention relates to a mounting method for a tank on a frame of a powered two-wheeler, in the case of which mounting method respective supporting elements of the tank are supported on respectively assigned bearing elements which are arranged on the two outer sides of a frame element. For particularly simple mounting of the tank on the frame and securing of the tank against an action of force in the vehicle transverse direction, it is provided according to the invention that the respective supporting elements are guided through an associated securing element which is arranged in a region of the respective bearing element and is fixed on the corresponding outer side of the frame element, as a result of which the respective securing element surrounds the respective supporting element at a spacing. This means that the respective supporting elements of the tank are moved by way of an at least substantially horizontal movement of the tank along the vehicle longitudinal direction of the powered two-wheeler relative to the frame element and, as a result, are brought into engagement with in each case one bearing element of the frame element. During the mounting operation, the respective supporting element is guided between an outer side of the frame element and the securing element which is, for example, tab-shaped. In the installed state of the tank, the respective supporting elements are therefore both connected to a respective bearing element and are surrounded by a respective securing element at a spacing. As a result, the tank is particularly advantageously secured against a relative movement relative to the frame element both in the vehicle vertical direction and in the vehicle transverse direction.

It is provided in one advantageous refinement of the invention that, in the case of an arrangement of the tank on the frame element, a C-shaped cutout of the respective supporting element is brought into engagement with a star-shaped rubber element of the bearing element by way of being placed onto the assigned bearing element. As a result, a particularly firm non-positive connection can advantageously be produced between the respective supporting element and the assigned bearing element.

Advantages and advantageous refinements of the tank arrangement according to the invention, the frame element according to the invention, the mounting method according to the invention and the powered two-wheeler according to the invention are to be considered in each case to be advantages and advantageous refinements of the respective other aspects of the invention.

Further features of the invention result from the claims, the figures and the description of the figures. The features and combinations of features mentioned above in the description and the features and combinations of features mentioned in the following text in the description of the figures and/or shown only in the figures can be used not only in the respective specified combination, but rather also in other combinations or on their own.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
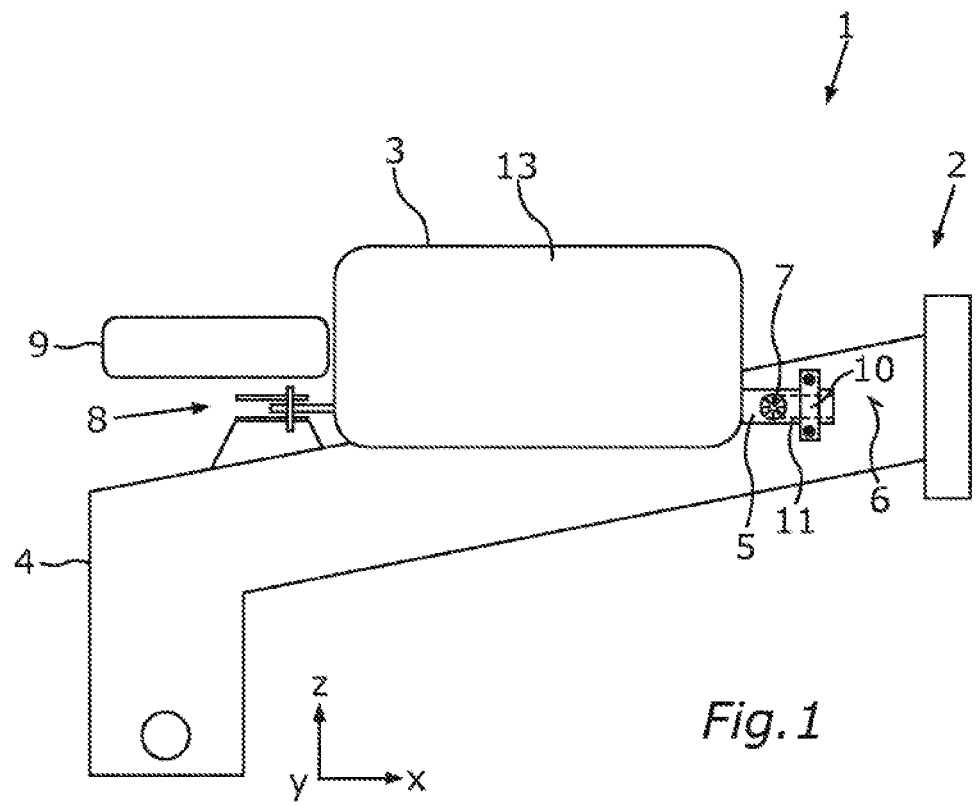
FIG. 1 shows a diagrammatic side view of a tank arrangement in accordance with an embodiment of the present invention having a tank which is fastened to a frame element of a frame of a powered two-wheeler and is connected to the frame element by respective supporting elements via assigned bearing elements, the respective supporting elements being secured by way of associated securing elements of the frame element against a relative movement of the tank relative to the frame element in the vehicle transverse direction, the respective securing element being arranged on the frame element on a side of the bearing element, which side faces away from the cavity of the tank which can be filled with fuel.
Figure 2:
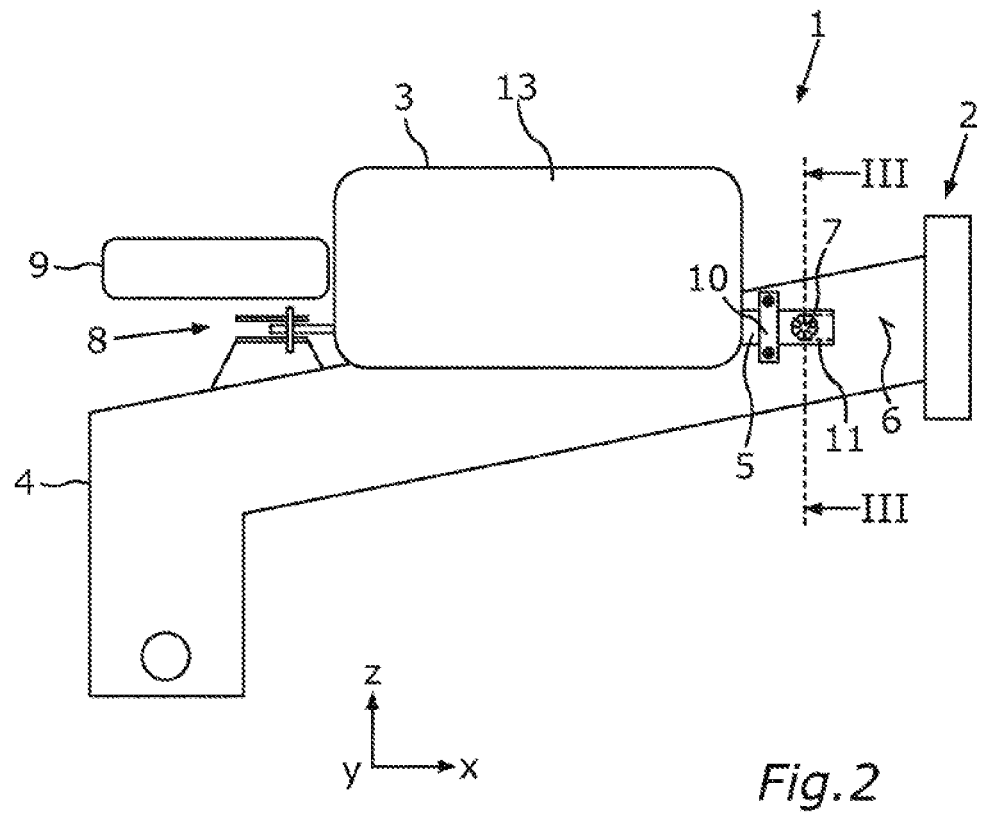
FIG. 2 shows a diagrammatic side view of the tank arrangement in accordance with another embodiment of the present invention, the respective securing element being arranged between the associated bearing element and the cavity of the tank, which cavity is set up to receive the fuel.

Both FIG. 1 and FIG. 2 in each case show a diagrammatic side view of a tank arrangement 1 on a frame 2 of a powered two-wheeler. The powered two-wheeler which can be, in particular, a motorcycle can be driven in the present case via an internal combustion engine by a fuel. The fuel for the internal combustion engine is received in a cavity of a tank 3 which, in an installed state, is arranged on a frame element 4 of the frame 2. Both the tank 3 and the frame element 4 are constituent parts of the tank arrangement 1.

In the present case, the tank 3 has two supporting elements 5 which, in the installed state of the tank 3, are arranged in each case on an outer side 6 of the frame element 4, which outer sides lie opposite one another in the vehicle transverse direction y of the powered two-wheeler. In the present case, both the respective supporting elements 5 and the tank 3 (which comprises the supporting elements 5) comprise a plastic. The respective supporting elements 5 are supported on respectively assigned bearing elements 7 which are arranged on the two outer sides 6 of the frame element 4. In the present case, the bearing elements 7 are what are known as star-shaped rubber elements which, in the installed state of the tank 3, are arranged between the respective supporting elements 5 and the outer side 6 of the frame element 4. As can be seen in FIGS. 1 and 2, on account of a support of the respective supporting elements 5 on the assigned bearing elements 7, the tank 3 is secured at least on one side against a relative movement of the tank 3 relative to the frame element 4 in the vehicle vertical direction z. A fastening device 8 which is arranged on the other side on the tank 3 and on the frame element 4 and is arranged in the present case below a seat cushion 9 of the powered two-wheeler serves to secure the tank 3 on the other side both in the vehicle vertical direction z and in the vehicle transverse direction y and in the vehicle longitudinal direction x. In addition to the two supporting elements 5, the tank 3 comprises a main body 13 which has the cavity, in which the fuel for driving the powered two-wheeler can be received.

In order to avoid lateral unclipping of the respective supporting elements 5 from the bearing elements 7 in the vehicle transverse direction y, the tank arrangement 1 comprises in each case one securing element 10 which belongs to the respective bearing element 7. The respective securing element 10 can be formed from a metal, and is fixed on the corresponding outer side 6 of the frame element 4. In the present case, the respective securing element 10 is connected by two screw connections 12 to the frame element 4. In the installed state of the tank 3 on the frame element 4, the respective securing element 10 surrounds the respective assigned supporting element 5 at a spacing, in order to prevent transmissions of oscillations and transmissions of vibrations from the frame element 4 to the tank 3. The respective securing element 10 is arranged in a close region of the respective bearing element 7 on the frame element 4.

In the illustration which is shown in FIG. 1, in the installed state of the tank 3, the securing element 10 is arranged on a side of the bearing element 7, which side faces away from the main body 13 of the tank 3. In the alternative embodiment which is shown in FIG. 2, in the installed state of the tank 3, the securing element 10 is arranged between the respective bearing element 7 and the main body 13.

Figure 3:
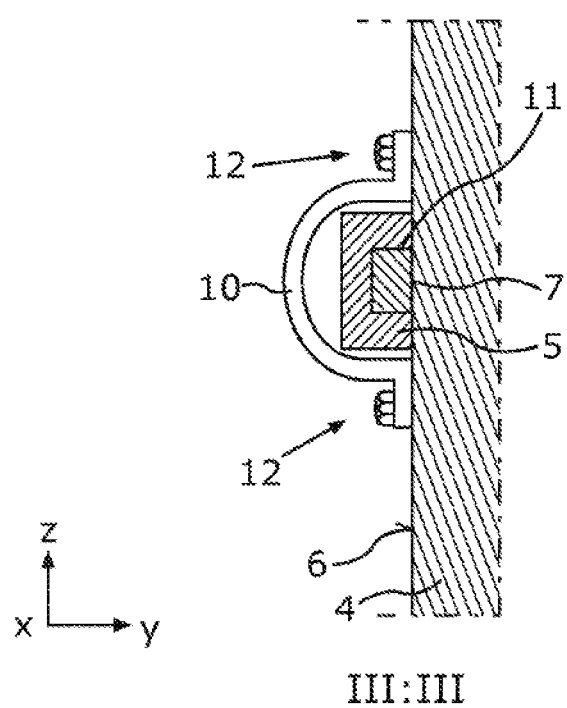
FIG. 3 shows a diagrammatic sectional view of the tank arrangement along the line III-III.

FIG. 3 shows a diagrammatic sectional view of a detail of the tank arrangement 1 along the line III-III. It can be seen in the illustration that the respective supporting element 5 has a cutout (in the present case, a C-shaped cutout 11), in which the respective bearing element 7 is received in the installed state of the tank 3. A C-shape of the cutout 11 is indicated by way of dashed lines in FIGS. 1 and 2, and makes it possible to support the respective supporting element 5 on the respective bearing element 7, by the cutout 11 being pushed along the vehicle longitudinal direction x over the respective bearing element 7 in a mounting method for the tank 3 on the frame element 4. During this, the respective supporting element 5 is pushed between the assigned securing element 10 and the respective outer side 6 of the frame element 4. As can be seen in FIG. 3, the securing element 10 secures the respective supporting element 5 against a relative movement of the respective supporting element 5 relative to the frame element 4 along the vehicle transverse direction y.

The tank arrangement 1 which is described in conjunction with FIGS. 1 to 3 is based on the finding that vehicle fuel tanks which are manufactured from plastic are generally, inter alia, what are known as blow molded tanks, in the case of which the supporting elements 5 are likewise formed from the plastic, from which the main body 13 is formed. The respective supporting elements 5 can be produced inexpensively in an injection molding method and can subsequently be used as insert parts during a blow molding process for producing the main body 13, in order to be connected to the main body 13 which is a fuel container. Accordingly, the attachment of the respective supporting elements 5 to the main body 13 takes place during production of the main body 13. The respective supporting elements 5 are subject to special requirements with regard to an oscillation and vibration behavior, since oscillations and vibrations which occur should be damped via the supporting elements 5. Furthermore, the supporting elements 5 should decouple oscillations and vibrations of a vehicle body, in particular the frame 2, from the main body 13, with the result that the latter is fastened as far as possible without oscillations to the frame 2 (in the present case, the frame element 4). In addition, the supporting elements 5 should withstand mechanical requirements of static and dynamic actions of force from the outside.

In the case of the tank arrangement 1 which is described in conjunction with FIGS. 1 to 3, the tank 3 lies at the front in the driving direction along the vehicle longitudinal direction x in each case on a star-shaped rubber element which is arranged on the outer side 6, and is not connected by screwing. At the rear in the vehicle longitudinal direction x, the tank 3 is fastened to the frame element 4 below the seat cushion 9 by means of the fastening device 8. By way of a release of the fastening device 8, the tank 3 can be pivoted about a pivot axis which is formed by way of the star-shaped rubber elements 7 and runs along the vehicle transverse direction y. A removal of the tank 3, that is to say a release of the tank 3 from the frame element 4, can take place by way of a release of the fastening device 8.

In order to increase the resistance of the tank arrangement 1 with respect to dynamic and static actions of force from the outside, in particular along the vehicle transverse direction y, the respective securing element 10 is arranged on the outer side 6 of the frame element 4 in a manner which is assigned to the respective bearing element 7. As a result, a mounting reinforcement is provided for the tank 3 on the frame element 4. On account of the respective securing element 10, unclipping of the respective supporting element 5 from the assigned bearing element 7 can be at least substantially prevented. As a result, in the case of an impact on one side of the powered two-wheeler, the tank 3 continues to lie with its respective supporting elements 5 on the respective bearing elements 7. For this purpose, the respective securing element 10 comprises a steel in the present case. Other materials are likewise possible if they withstand certain requirements. An attachment of the respective securing element 10 can be fixed on the frame and can additionally be freely selected in terms of its shape. In order to make mounting of the tank 3 on the frame element 4 possible, securing by the respective securing element 10 can take place before or after supporting of the respective supporting elements 5 on the respective bearing elements 7. On account of an attachment of the respective securing element 10 in a manner which is fixed on the frame, the respective assigned supporting element 5 can particularly advantageously be secured against unclipping, without an additional mounting step being necessary. Moreover, the unclipping of the tank 3, in particular the unclipping of the respective supporting elements 5 from the respective bearing elements 7, at a high pressure and/or at a high temperature can be at least substantially avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF DESIGNATIONS

1 Tank arrangement
2 Frame
3 Tank
4 Frame element
5 Supporting element
6 Outer side
7 Bearing element
8 Fastening device
9 Seat cushion
10 Securing element
11 Cutout
12 Screw connection
13 Main body
x Vehicle longitudinal direction
y Vehicle transverse direction
z Vehicle vertical direction

What is claimed is:

1. A tank arrangement on a frame of a powered two-wheeler, comprising:
   a tank;
   a frame element having lateral sides transverse to a longitudinal travel direction of the powered two-wheeler;
   bearing elements arranged on the lateral sides of the frame element;
   supporting elements configured to support the tank on the bearing elements; and
   securing elements arranged on each of the lateral sides of the frame element,
   wherein
      each of the securing elements is arranged to surround a respective one of the supporting elements at a spacing, and
      the supporting elements each have a side a C-shaped cutout which faces respective ones of the lateral sides of the frame element, and
      the C-shaped cutouts are configured to be engaged with respective ones of the bearing elements when the tank is in an installed position on the frame element.

2. The tank arrangement according to claim 1, wherein the tank is formed from plastic, and
the securing element is formed from metal.

3. The tank arrangement according to claim 2, wherein the supporting elements are configured as part of the tank, and
the supporting elements are formed from plastic.

4. The tank arrangement according to claim 1, wherein the bearing elements are star-shaped rubber elements.

5. A frame element for a powered two-wheeler, comprising:
   two bearing elements, each of the two bearing elements being arranged on respective lateral sides of the frame element that are transverse to a longitudinal travel direction of the powered two-wheeler; and
   two securing elements, each of the two securing elements being arranged on respective ones of the lateral sides of the frame element,
   wherein
      the two bearing elements are configured to support a tank of the powered two-wheeler via respective supporting elements between the two bearing elements and the tank, and
      the two securing elements are configured to surround respective ones of the supporting elements at a spacing when the tank is in an installed position on the frame element and
      the supporting elements each have a side a C-shaped cutout which faces respective ones of the lateral sides of the frame element, and
      the C-shaped cutouts are configured to be engaged with respective ones of the bearing elements when the tank is in an installed position on the frame element.

6. The frame element according to claim 5, wherein the two securing element are arranged on lateral sides of the frame element adjacent to the respective two bearing elements, and
the two bearing elements are star-shaped rubber elements.

7. A mounting method for a tank on a frame of a powered two-wheeler, the frame element having lateral sides transverse to a longitudinal travel direction of the powered two-wheeler, bearing elements arranged on the lateral sides of the frame element, securing elements arranged on each of the lateral sides of the frame element, the securing elements being arranged to surround at a spacing respective supporting elements configured to support the tank on the bearing elements, the method comprising the acts of:
   guiding the supporting elements over the bearing elements and into respective regions between the lateral sides of the frame element and the securing elements
   wherein the supporting elements each have a side a C-shaped cutout which faces respective ones of the lateral sides of the frame element, and during the act of guiding the supporting elements the C-shaped cutouts engage the bearing elements such that when the tank is in an installed position on the frame element the tank is supported by the bearing elements via the supporting elements.

* * * * *